UNITED STATES PATENT OFFICE.

WILLIAM MORRISON, OF DES MOINES, IOWA.

STORAGE-BATTERY CONDUCTOR OR SUPPORT.

1,021,997.　　Specification of Letters Patent.　　Patented Apr. 2, 1912.

No Drawing.　　Application filed February 24, 1912.　Serial No. 679,704.

*To all whom it may concern:*

Be it known that I, WILLIAM MORRISON, a citizen of the United States, residing at Des Moines, in the county of Polk and State of Iowa, have invented certain new and useful Improvements in Storage-Battery Conductors or Supports, of which the following is a specification.

This invention is a grid or other conductor or support for the active material of lead storage batteries. These grids commonly consist of alloys of lead and antimony, to which a small percentage of tin is sometimes added. The antimony hardens and stiffens the grid, but, by reason of its coarsely-crystalline character, renders the grid porous, permeable to the battery solution and subject to internal chemical and electrochemical attack. The present invention is an alloy for such grids, consisting of lead, a hardening metal or metals, and a member of the periodic sulfur group having an atomic weight higher than that of sulfur, to wit, selenium or tellurium. The addition of either of these elements to the usual lead-antimony alloy makes it fine-grained, dense, non-porous, and resistant to attack in the battery. Furthermore these two elements, being of electronegative character, will remain in the positive-pole grids during the charging and peroxidation of the active material, being very slightly soluble in a solution of sulfuric acid, precipitated by sulfurous acid, and, in so far as they dissolve, forming ions which remain at the anode.

The alloy may be made in various ways, usually by first forming an alloy of antimony and selenium or tellurium and then adding the lead. As some of the selenium or tellurium is apt to burn out of the finished alloy during the casting of the grids, it is desirable, in practice, to examine the freshly-cast grids from time to time during the casting operation to determine that they contain sufficient selenium or tellurium to give them the desired characteristics.

I claim:—

1. A storage-battery conductor or support, consisting of lead, a member of the periodic sulfur group having an atomic weight higher than that of sulfur, and another metal.

2. A storage-battery conductor or support, consisting of lead, a member of the periodic sulfur group having an atomic weight higher than that of sulfur, and other metals.

3. A storage-battery conductor or support, consisting of lead, a member of the periodic sulfur group having an atomic weight higher than that of sulfur, and antimony.

In testimony whereof I affix my signature in presence of two witnesses.

WILLIAM MORRISON.

Witnesses:
　EUGENE A. BYRNES,
　C. W. FOWLER.